United States Patent
Marchionni et al.

(10) Patent No.: US 7,247,737 B2
(45) Date of Patent: Jul. 24, 2007

(54) PERFLUOROPOLYETHERS COMPRISING REPEATING UNITS OBTAINED FROM OXIDATION OF PERFLUORODIOXOLES

(75) Inventors: Giuseppe Marchionni, Milan (IT); Ugo De Patto, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 621 days.

(21) Appl. No.: 10/458,308

(22) Filed: Jun. 11, 2003

(65) Prior Publication Data

US 2003/0232922 A1     Dec. 18, 2003

(30) Foreign Application Priority Data

Jun. 11, 2002     (IT)     .................. MI2002A1277

(51) Int. Cl.
  *C07D 317/34*     (2006.01)
  *C07D 317/42*     (2006.01)

(52) U.S. Cl. ................................. 549/449; 549/455

(58) Field of Classification Search .............. 549/455, 549/428, 449
See application file for complete search history.

(56) References Cited

U.S. PATENT DOCUMENTS

| | | |
|---|---|---|
| 3,242,218 A | 3/1966 | Miller |
| 3,715,378 A | 2/1973 | Sianesi et al. |
| 3,810,874 A | 5/1974 | Mitsch et al. |
| 3,865,845 A | 2/1975 | Resnick ............ 260/340.9 |
| 4,523,039 A | 6/1985 | Lagow et al. |
| 4,647,413 A | 3/1987 | Savu |
| 5,000,830 A | 3/1991 | Marchionni et al. |
| 5,144,092 A | 9/1992 | Marraccini et al. |
| 5,149,842 A * | 9/1992 | Sianesi et al. ............ 549/550 |
| 5,237,108 A | 8/1993 | Marraccini et al. ......... 568/615 |
| 5,258,110 A | 11/1993 | Sianesi et al. |

FOREIGN PATENT DOCUMENTS

| | | |
|---|---|---|
| EP | 0 148 482 A2 | 7/1985 |
| EP | 0 239 123 A2 | 9/1987 |
| EP | 0 340 739 A2 | 11/1989 |
| EP | 0 340 740 A2 | 11/1989 |
| GB | 1104482 | 2/1968 |
| WO | WO 97/28205 | 8/1997 |

OTHER PUBLICATIONS

International Publication No. WO 90/03357, published Apr. 5, 1990.
"Structure-Property Relationships in Perfluoropolyethers", *Comprehensive Polymer Science, Second Supplement*, Cap. 9, p. 351, 1996.

* cited by examiner

*Primary Examiner*—Kamal A. Saeed
*Assistant Examiner*—Janet L. Coppins
(74) *Attorney, Agent, or Firm*—Arent Fox LLP

(57) ABSTRACT

Perfluoropolyethers obtained by oxidation of perfluorodioxoles of formula (I)

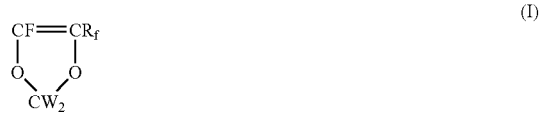

wherein $R_f$=—F, —(O)$_y$C$_n$F$_{2n+1}$ with y=0, 1 and n=1, 2, 3, 4, 5, and with W=—F, —C$_n$F$_{2n+1}$,
optionally in the presence of tetrafluoroethylene and/or hexafluoropropene, and subsequent reduction of the obtained peroxidic perfluoropolyethers.

14 Claims, No Drawings

PERFLUOROPOLYETHERS COMPRISING REPEATING UNITS OBTAINED FROM OXIDATION OF PERFLUORODIOXOLES

The present invention relates to perfluoropolyethers (PFPE) and their preparation starting from perfluorodioxoles.

More specifically it relates to perfluoropolyethers having a high number of pendent reactive groups from the main chain capable to supply by decomposition in protic environment linear perfluoropolyethers having a high average functionality, even up to 2.

The functionality of a linear PFPE represents the average number of end reactive groups present in each PFPE molecules. Said number can be at most 2.

Perfluoropolyethers and processes for preparation thereof are known, in particular it is known from patents U.S. Pat. Nos. 5,149,842, 5,000,830, 5,144,092, to prepare perfluoropolyethers having repeating units —($CF_2O$)—, —($CF_2CF_2O$)—, —($CF(CF_3)O$)—, —($CF_2CF(CF_3)O$)—, by tetrafluoroethylene and/or hexafluoropropene oxidation. Mono- or bifunctional linear perfluoropolyethers are known from patents GB 1,104,482, U.S. Pat. Nos. 3,715,378, 3,242,218, 4,647,413, EP 148,482, U.S. Pat. No. 4,523,039, EP 340,740, patent application WO 90/03357, U.S. Pat. No. 3,810,874, EP 239,123, U.S. Pat. Nos. 5,149,842, 5,258,110.

It is known to prepare compounds having a perfluoropolyether structure with reactive terminations of the —$CF_2COOR$, —$CF(CF_3)COOR$, —$CF_2C(OH)(OR)CF_3$ type, by chemical reduction of the corresponding perfluoropolyethers containing peroxidic groups (PO, defined as g of active oxygen/100 g of compound). See for example "Comprehensive Polymer Science", second supplement, chapter 9, page 351, 1996.

To obtain perfluoropolyethers having a controlled average molecular weight, with functionality close to 2, it is necessary to start from perfluoropolyethers having a high PO.

However the obtainment of high PO perfluoropolyethers is limited in that said PFPEs show the drawback to be unstable (shock sensitive) and explosive. For example the perfluoropolyethers prepared starting from tetrafluoroethylene have a limit to be safety treated, represented by a PO value of the order of 4-5. The perfluoropolyethers prepared by hexafluoropropene have a limit to be safety treated represented by a PO value of the order of 1-1.5. Therefore it is not possible, starting from hexafluoropropene, to obtain perfluoropolyethers having a PO value higher than 1.5 and therefore, by subsequent decomposition of the peroxidic bonds, to obtain PFPEs having a functionality near 2. Therefore said perfluoropolyethers cannot be used as comonomers to give, by polycondensation, polymers having good mechanical properties. Also in the case of PFPEs prepared starting from tetrafluoroethylene (TFE) it is necessary to observe the safety limits due to PO, implying a careful control and running of the reaction.

The need was therefore felt to have available linear perfluoropolyethers having an improved functionality approaching to 2, without using starting perfluoropolyethers having a high number of peroxidic bonds (high PO).

The Applicant has unexpectedly and surprisingly found that it is, possible to prepare linear perfluoropolyethers having high average functionality, also up to 2, by using the perfluoropolyethers of the invention as described hereunder.

An object of the present invention are perfluoropolyethers of formula (II)

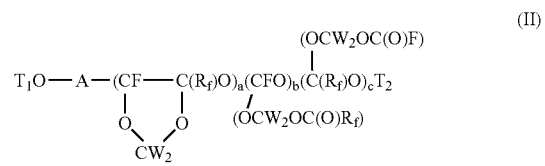

wherein:

$T_1$, $T_2$, equal to or different from each other, are selected from —$CF_2X$ (X=F, $CF_3$, $C_2F_5$, Cl), —$CW_2COF$, —$C(O)R_f$, with $R_f$=F, $(O)_yC_nF_{2n+1}$ with y=0, 1 and n=1, 2, 3, 4, 5, preferably 1;

W is —F, —$C_nF_{2n+1}$, preferably —F or —$CF_3$; a, b, c, can be integers or zero such that the sum a+b+c ranges between 1 and 10,000, and when b and c are 0, $T_1$, $T_2$ can also be —$CW_2COOR$, —$CW_2C(OH)(OR)CF_3$ with R=H, $CH_3$, $C_2H_5$, $C_3H_7$;

A is a simple bond or an oxyperfluoroalkylene structure selected from:

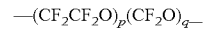

wherein p, q are integers from 0 to 10,000, (p+q) is at least equal to 1 and the sum (a+b+c+q+p) ranges from 2 to 30,000;

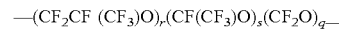

wherein r, s, q are integers from 0 to 10,000 and the sum (r+s+q) is at least 1 and the sum (a+b+c+r+s+q) has a value ranging from 2 to 30,000;

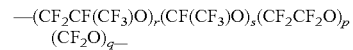

with the indexes as above such that their sum (a+b+c+r+s+p+q) ranges from 3 to 30,000;

the oxyperfluoroalkylene units being statistically distributed along the chain.

The formula (II) compounds of the invention are prepared by oxidation of perfluorodioxoles, optionally in the presence of perfluoropropene and/or tetrafluoroethylene, with oxygen in the presence of ultraviolet radiations or with oxygen in the presence of radical initiators, and subsequent reduction of the obtained peroxidic perfluoropolyethers by heating or ultraviolet light irradiation or chemical reduction.

A further object of the invention is a process for the preparation of the compounds of formula (II) comprising:
1) oxidation of the perfluorodioxoles of formula (I)

wherein $R_f$=—F, —$(O)_yC_nF_{2n+1}$, y=0, 1; n=1, 2, 3, 4, 5, preferably 1; W is —F, —$C_nF_{2n+1}$, preferably —F or —$CF_3$, optionally in the presence of perfluoropropene and/or tetrafluoroethylene, with gaseous oxygen, in a reaction medium formed by a fluorocarbon and/or a fluoroether which is liquid under the process conditions, preferably the fluorocarbon is selected from perfluorocarbons (FC), chlorofluorocarbons (CFC), hydrochlorofluorocarbons (HCFC), hydrofluorocarbons (HFC), and the fluoroether is selected from perfluoropolyethers (PFPE), hydrofluoroethers (HFE) and hydrofluoropolyethers (HFPE), at a temperature in the range between −100° C. and +50° C., preferably between −90° C. and −30° C., by irradiating the liquid reaction mixture with light having a wave length between 2,000 and 6,000 Å or by feeding in the liquid reaction mixture one or more radical initiators;

2) reduction of the peroxidic perfluoropolyethers obtained in step 1) of formula (III)

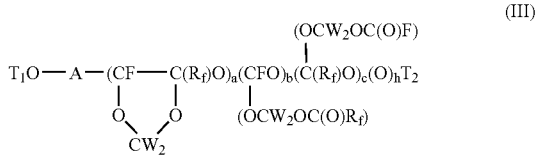

wherein:

$T_1$, $T_2$, A, a, b, c, $R_f$, W are as defined for formula (II), h is an integer and h/(a+b+c+r+s+p+q) is comprised between 0.01 and 0.8.

The step 2) reduction can be carried out by heating at temperatures in the range 150°-250° C. or by irradiation with light having a wave length between 2,000 and 6,000 Å, at temperatures between −40° C. and 150° C. or by using hydrogen and an hydrogenation catalyst, obtaining the perfluoropolyethers of formula (II); or by using reducing agents such as HI or HI/SO$_2$ under protic conditions, for example in hydroalcoholic medium, obtaining the formula (II) perfluoropolyethers wherein b and c are equal to zero and $T_1$, $T_2$ are —CF$_2$X (X=F, CF$_3$, C$_2$F$_5$, Cl), —CW$_2$COOR, —CW$_2$C (OH) (OR) CF$_3$ with R=H, CH$_3$, C$_2$H$_5$, C$_3$H$_7$.

When hydrogen is used the catalysts are for example Pd, Pt.

Step 1) can also be carried out in the presence of CF$_2$=CFOR'$_f$ perfluoroalkylvinylethers, wherein R'$_f$ is a perfluoroalkyl group CF$_3$—, C$_2$F$_5$—, nC$_3$F$_7$—, isoC$_3$F$_7$—, or —(CF$_2$O)$_z$—R'$_f$, —(CF$_2$CF$_2$O)$_{z'}$—R'$_f$, —(CF$_2$O)$_z$ (CF$_2$CF$_2$O)$_{z'}$—R'$_f$ with z, z'=1, 2, 3, 4, 5, 6 and R'f is as above, or of a perfluorinated conjugated diene, such for example C$_4$F$_6$ perfluorobutadiene.

When the perfluorodioxole used in the process is liquid or if hexafluoropropene is used as comonomer, the solvent use is optional.

As radical initiators are meant compounds of F—Q formula wherein Q is selected in the group formed by F or Cl; or Q is —OR"$_f$ wherein R"$_f$ is a perfluoroalkyl radical from 1 to 3 carbon atoms, or Q is —O(R$_f$"'O)$_u$—F with R$_f$"'6 perfluoroalkylene radical —CF$_2$— and/or —CF$_2$CF$_2$— and/or CF$_2$CF(CF$_3$)— and/or —CF(CF$_3$)— and u is an integer from 1 to 100, or Q is —O(R$_f$"'O)$_u$R"$_f$.

Preferably the initiator is fed in admixture with an inert gas. The molar ratio between the initiator and the monomers is comprised between 0.0001 and 0.5.

The absolute pressure is comprised between 1 and 15 atm.

The reaction can be carried out in a discontinuous or in a continuous way by drawing from the reactor a portion of the reacted liquid phase, subjecting it to distillation and recycling the optional solvent and the unreacted monomer or monomers.

The perfluorodioxoles ar known compounds, see for example patents U.S. Pat. No. 3,865,845, EP 80,187, EP 76,581, EP 937,720, EP 633,257. The perfluorodioxoles used in the present invention have general formula (I)

wherein $R_f$=—F, —(O)$_y$C$_n$F$_{2n+1}$, y=0, 1; n=1, 2, 3, 4, 5, preferably 1; W is —F, —C$_n$F$_{2n+1}$, preferably —F or —CF$_3$.

The peroxidic perfluoropolyethers of formula (III) which are used in the preparation of the compounds of formula (II) are a further object of the present invention.

The invention compounds of formula (II) and (III) contain the following repeating units:

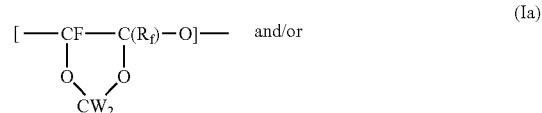

The formula (II) compounds containing the repeating units (Ib) and/or (Ic) which are reactive and optionally reactive end units as —CW$_2$COF, —C(O)R$_f$, as well as the formula (II) compounds wherein the b and c indexes are equal to zero and $T_1$, $T_2$, equal to or different from each other, selected between —CW$_2$COOR, —CW$_2$C(OH) (OR) CF$_3$, can be transformed into compounds having classic functional terminations of the organic chemistry such as amines, alcohols, aldehydes, salts, nitriles, amides. Said compounds are used in the surface modification of various substrata to confer thereto properties such for example oil- and hydro-repellence, and a low friction coefficient, or they can be used as comonomers to obtain block polymers, such for example polyesters, polyurethanes or polyamides, for use at low temperatures.

As said the invention perfluoropolyethers show the advantage with respect to the known PFPEs, deriving both from TFE and/or perfluoropropene polymerization to be able to operate under safety conditions as regards the PO limits and contemporaneously to obtain linear PFPEs having a high functionality near 2.

The compounds of the invention of formula (II), preferably those with A different from 0, have the advantage that the repeating units (Ib) and (Ic) contained therein can generate, by decomposition in protic medium, the same number of reactive functions obtainable by reduction of peroxidic bonds of perfluoropolyethers not containing units deriving from perfluorodioxoles.

It is therefore possible to avoid the use of perfluoropolyethers having a high PO according to the teaching of the prior art to obtain compounds having a controlled average molecular weight with a high number of reactive end groups.

The products according to the invention because of their perfluoropolyether structure have a very high stability and show a very low $T_g$, of the order of −100/−120° C.

Illustrative Examples follow which are not limitative of the present invention.

EXAMPLES

Example 1

457 g of $CF_2Cl_2$ are introduced at the temperature of $-60°$ C. in a cylindrical glass reactor (500 ml volume and optical path of 1 cm) equipped with an internal quartz coaxial sheath and also with a bubbling pipe for the gas introduction, with a sheath with thermocouple to detect the internal temperature and with a reflux condenser maintained at the temperature of $-80°$ C. Through the bubbling pipe 20 Nl/h of $O_2$ are let bubble in the reactor. By a refrigerating bath put outside the reactor the temperature of the liquid reacting phase is maintained at $-60°$ C. during the whole test. After a UV ray lamp of the HANAU TQ 150 type (which emits 47 watt of UV radiation having wave length comprised between 2,000 and 3,000 A°) has been introduced in the quartz sheath, it is switched on and with a gas burette 0.6 Nl/h (26.8 mmoles/h) of 5-trifluoro-methoxy-2,2,4-trifluoro-1,3-dioxole are fed.

The irradiation and the reacting gas feeding is continued for 5 hours. The UV lamp heat is controlled by a closed cycle cooling system. After 5 hours of irradiation the lamp is switched off and the $CF_2Cl_2$ is recovered by evaporation at room temperature. 20.4 g of a colourless oily polymeric residue are obtained. Such product has (iodometric titration) an active oxygen (PO) content equal to 1.04% by weight and a viscosity at 20° C. equal to 15 cSt and by NMR $^{19}F$ analysis it results formed by chains of the type:

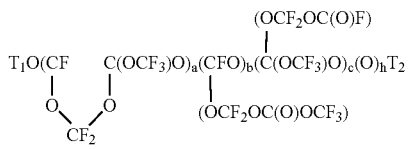

wherein $T_1$, $T_2$ equal to or different from each other, are end groups of the $-CF_2Cl$, $-CF_3$, $-COF$, $-C(O)OCF_3$ type, wherein the ratio between the inert end groups ($-CF_2Cl$, $-CF_3$) and the reactive end groups ($-COF$, $-C(O)OCF_3$) is equal to 1, and wherein the average index value is the following: a=3.2, b=1.3, c=9.1, h=2.3, and a number average molecular weight of 3,570 is calculated.

Example 2

18 g of product obtained in Example 1 are introduced in a 50 ml glass flask, equipped with stirrer, thermometer and water cooled reflux condenser. The temperature is brought to 250° C. and maintained constant for 6 hours. At the end of the test 13.5 g of product having viscosity at 20° C. equal to 8.5 cSt are recovered, which by NMR $^{19}F$ analysis results formed by non peroxidic chains, wherefrom an average molecular weight of 2,750 is calculated. The product subjected to iodometric analysis confirms the absence of active oxygen (PO=0).

Example 3

446 g of $C_3F_6$ are introduced at the temperature of $-60°$ C. in a cylindrical glass reactor (500 ml volume and optical path of 1 cm) equipped with an internal quartz coaxial sheath and also with a bubbling pipe for the gas introduction, with a sheath with thermocouple to detect the internal temperature and with a reflux condenser maintained at the temperature of $-80°$ C. Through the bubbling pipe 20 Nl/h of $O_2$ are let bubble in the reactor.

By a refrigerating bath put outside the reactor the temperature of the liquid reacting phase is maintained at $-60°$ C. during the whole test. After a UV ray lamp of the HANAU TQ 150 type (which emits 47 watt of UV radiation having a wave length comprised between 2,000 and 3,000 A°) has been introduced in the quartz sheath, it is switched on and with a gas burette 0.6 Nl/h (26.8 mmoles/h) of 5-trifluoro-methoxy-2,2,4-trifluoro-1,3-dioxole are fed.

The irradiation and the reacting gas feeding is continued for 5 hours. The UV lamp heat is controlled by a closed cycle cooling system. After 5 hours of irradiation the lamp is switched off, the inert gases are stripped and the unreacted $C_3F_6$ is recovered from the reactor by evaporation at room temperature. 205.2 g of a colourless oily polymeric residue are obtained. Said product has (iodometric titration) an active oxygen (PO) content equal to 0.30% by weight and a viscosity at 20° C. equal to 598 cSt and by NMR $^{19}F$ analysis it results formed by chains of type:

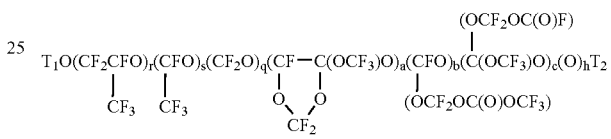

wherein $T_1$, $T_2$, equal to or different from each other, are end groups $-CF_3$, $-COF$, $-CF(CF_3)COF$, $-CF_2COF$, $-C(O)OCF_3$, wherein the ratio between the inert end group $-CF_3$ and the reactive end groups ($-COF$, $-CF(CF_3)COF$, $-CF_2COF$, $-C(O)OCF_3$) is equal to 1, and wherein the average index value is the following: r=18.5, s=2.1, q=1.1, a=1.2, b=0.5, c=0.5, h=0.8, and a number average molecular weight of 4,240 is calculated.

Example 4

87 g of product obtained in Example 3 are introduced in a 250 ml glass flask, equipped with stirrer, thermometer and water cooled reflux condenser. The temperature is brought to 250° C. and maintained condenser for 6 hours. At the end of the test 79 g of product having viscosity at 20° C. equal to 311 cSt are recovered, which by NMR $^{19}F$ analysis results formed by non peroxidic chains, wherefrom an average molecular weight of 3,920 is calculated. The product subjected to iodometric analysis confirms the absence of active oxygen (PO=0).

Example 5

98 g of product obtained in Example 3 dissolved in 100 ml of 1,1,2-trichloro-1,2,2-trifluoroethane are dripped on a solution of 20 g of aqueous hydriodic acid at 57% in 50 ml of methanol in one hour in a 500 ml glass flask equipped with stirrer, thermometer and water cooled reflux condenser, at the temperature of 40° C. After 2 hours always at 40° C., it is cooled at room temperature, the whole is transferred into a separatory funnel containing a solution of 10 g of $Na_2S_2O_5$ in 200 ml of water so as to reduce by stirring the iodine formed in the reaction and to clear the two liquid phases.

One separates the heavy layer which is maintained under reflux in a 500 ml flask containing 100 ml of a hydrochloric acid solution at 10 g in water/methanol (⅔ by volume).

After 3 hours it is cooled and let decant in separatory funnel, the heavy phase is discharged, the chlorofluorocarbon solvent is evaporated, 70 g of a product having a zero active oxygen content (PO=0) are recovered, which by I.R. spectroscopic analysis and by NMR $^{19}$F analysis results to have the following structure:

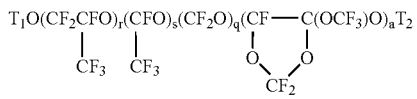

wherein $T_1$, $T_2$, equal to or different from each other, represent the end groups, so distributed: non functional, as —$CF_3$ equal to 0.36 and functional as —$CF_2COOH$, —$CF(CF_3)COOH$, —$CF_2C(OH)_2CF_3$ equal to 1.64 and in a ratio ($CF_2COOH+CF(CF_3)COOH$)/$CF_2C(OH)_2CF_3$) equal to 4.

It is calculated then that the 64% of the molecules results bifunctional; furthermore the average index values are r=6.4, s=0.75, q=0.39, a=0.43 with a number average molecular weight equal to 1,450.

The same reductive treatment on a perfluoropolyether obtained starting from hexafluoropropene, having the same peroxidic power (PO=0.3%) but without groups in the chain deriving from dioxole, leads to a derivative having the same end groups, with a ratio between inert and functional end groups such that the bifunctional molecules represent the 40%.

Example 6

439 g of $CF_2Cl_2$ are introduced at the temperature of –60° C. in a cylindrical glass reactor (500 ml volume and optical path of 1 cm) equipped with an internal quartz coaxial sheath and also with a bubbling pipe for the gas introduction, with a sheath with thermocouple to detect the internal temperature and with a reflux condenser maintained at the temperature of –80° C. Through the bubbling pipe 20 Nl/h of $O_2$ and 2 Nl/h of $C_2F_4$ are let bubble in the reactor. By a refrigerating bath put outside the reactor the temperature of the reacting liquid phase is maintained at –60° C. during the whole test. After a UV ray lamp of the HANAU TQ 150 type (which emits 47 watt of UV radiation having wave length comprised between 2,000 and 3,000 A°) has been introduced in the quartz sheath, it is switched on and with a gas burette 0.24 Nl/h (10.7 mmoles/h) of 5-trifluoro-methoxy-2,2,4-trifluoro-1,3-dioxole are fed.

The irradiation and the reacting gas feeding is continued for 5 hours. The UV lamp heat is controlled by a closed cycle cooling system. After 5 hours of irradiation the lamp is switched off, and $CF_2Cl_2$ is recovered by evaporation at room temperature. 34.6 g of a colourless oily polymeric residue are obtained. Such product has (iodometric titration) an active oxygen (PO) content equal to 0.62% by weight and a viscosity at 20° C. equal to 39.8 cSt and by NMR $^{19}$F analysis it results formed by chains of the type:

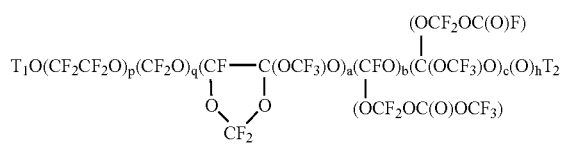

wherein $T_1$, $T_2$, equal to or different from each other, are end groups of the type —$CF_2Cl$, —$CF_3$, —COF, —$CF_2COF$, —$C(O)OCF_3$, wherein the ratio between the inert end groups (—$CF_2Cl$, —$CF_3$) and the reactive end groups (—COF, —$CF_2COF$, —$C(O)OCF_3$) is equal to 1, and wherein the average index value is the following: p=8.0, q=16.2, a=0.2, b=1.0, c=2.6, h=1.4, and a number average molecular weight of 3,630 is calculated.

Example 7

31.6 g of compound obtained in Example 6 are introduced in a 50 ml glass flask, equipped with stirrer, thermometer and water cooled reflux condenser. The temperature is brought to 250° C. and maintained constant for 6 hours. At the end of the test 19.1 g of product having viscosity at 20° C. equal to 19.6 cSt are recovered, which by NMR $^{19}$F analysis results formed by non peroxidic polyether chains, wherefrom a number average molecular weight of 2,890 is calculated. The product subjected to iodometric analysis confirms the absence of active oxygen (PO=0).

The invention claimed is:

1. Perfluoropolyethers of formula (II)

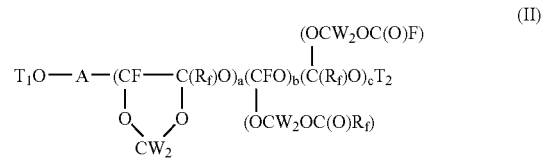

wherein:

$T_1$, $T_2$, equal to or different from each other, are selected from —$CF_2X$ (X=F, $CF_3$, $C_2F_5$, Cl), —$CW_2COF$, —C(O—)$R_f$, with $R_f$=F, (O)$_y$C$_n$F$_{2n+1}$ with y=0, 1 and n=1, 2, 3, 4, 5; W is —F, —C$_n$F$_{2n+1}$; a, b, c, can be integers or zero such that the sum a+b+c ranges between 1 and 10,000, and when b and c are 0, $T_1$, $T_2$ can also be —$CW_2COOR$, —$CW_2C(OH)(OR)CF_3$ with R=H, $CH_3$, $C_2H_5$, $C_3H_7$;

A is a simple bond or an oxyperfluoroalkylene structure selected from:

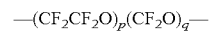

wherein p, q are integers from 0 to 10,000, (p+q) is at least equal to 1 and the sum (a+b+c+q+p) ranges from 2 to 30,000;

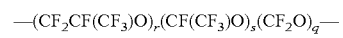

wherein r, s, q are integers from 0 to 10,000 and the sum (r+s+q) is at least 1 and the sum (a+b+c+r+s+q) has a value ranging from 2 to 30,000;

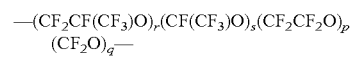

with the indexes as above such that their sum (a+b+c+r+s+p+q) ranges from 3 to 30,000;

the oxyperfluoroalkylene units being statistically distributed along the chain.

2. Peroxidic perfluoropolyethers of formula (III)

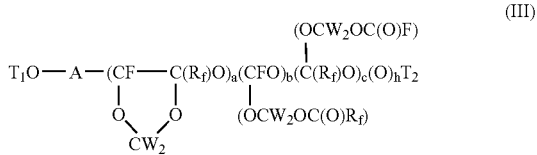

wherein:
$T_1$, $T_2$, A, a, b, c, $R_f$, W are defined as in claim 1, h is an integer and $h/(a+b+c+r+s+p+q)$ is comprised between 0.01 and 0.8.

3. A process for preparing the compounds of claim 1 of formula (II), comprising:
1) oxidation of the perfluorodioxoles of formula (I)

wherein $R_f$=—F, —$(O)_y C_n F_{2n+1}$, y=0, 1; n=1, 2, 3, 4, 5; W is —F, —$C_n F_{2n+1}$,
optionally in the presence of perfluoropropene and/or tetrafluoroethylene, with gaseous oxygen, in a reaction medium formed by a fluorocarbon and/or a liquid fluoroether under the process conditions, at a temperature in the range between −100° C. and +50° C., by irradiating the liquid reaction mixture with light having a wave length between 2,000 and 6,000 Å or by feeding in the liquid reaction mixture one or more radical initiators;
2) reduction of the peroxidic perfluoropolyethers obtained in step 1) of formula (III)

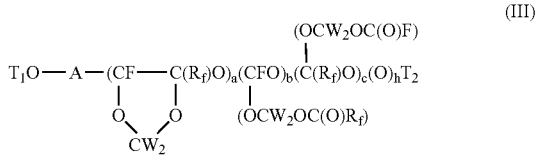

wherein:
$T_1$, $T_2$, A, a, b, C, $R_f$, W are as defined for formula (II), h is an integer and $h/(a+b+c+r+s+p+q)$ is comprised between 0.01 and 0.8.

4. A process according to claim 3, wherein the fluorocarbon is selected from perfluorocarbons (FC), chlorofluorocarbons (CFC), hydrochlorofluorocarbons (HCFC), hydrofluorocarbons (HFC), and the fluoroether is selected from perfluoropolyethers (PFPE), hydrofluoroethers (HFE) and hydrofluoropolyethers (HFPE).

5. A process according to claim 3, wherein the radical initiator is a compound of formula F—Q wherein Q is selected in the group formed by F or Cl; or Q is —$OR''_f$ wherein $R''_f$ is a perfluoroalkyl radical from 1 to 3 carbon atoms, or Q is —$O(R'''_f O)_u$—F with $R'''_f$ perfluoroalkylene radical —$CF_2$— and/or —$CF_2 CF_2$— and/or $CF_2 CF(CF_3)$— and/or —$CF(CF_3)$— and u is an integer from 1 to 100 or Q is —$O(R'''_f O)_u R''_f$ used in a molar ratio with respect to the monomers comprised between 0.0001 and 0.5.

6. A process according to claim 3, wherein the reduction of the formula (III) compounds is carried out by a process selected from:
heating at temperatures in the range 150°-250° C.,
irradiation with light having a wave length between 2,000 and 6,000 Å, at temperatures between −40° C. and 150° C.,
catalytic reduction with hydrogen, obtaining the perfluoropolyethers of formula (II).

7. A process according to claim 3, wherein the reduction of the formula (III) compounds is carried out by using reducing agents obtaining the formula (II) perfluoropolyethers wherein the b and c indexes are equal to zero and $T_1$, $T_2$ are —$CF_2 X$ (X=F, $CF_3$, $C_2 F_5$, Cl), —$CW_2 COOR$, —$CW_2 C(OH)(OR)CF_3$ with R=H, $CH_3$, $C_2 H_5$, $C_3 H_7$.

8. Perfluoropolyethers according to claim 1, wherein n=1.

9. Perfluoropolyethers according to claim 1, wherein W is —F or —$CF_3$.

10. A process according to claim 3, wherein in the perfluorodioxoles of formula (I), n=1.

11. A process according to claim 3, wherein in the perfluorodioxoles of formula (I), W is —F or —$CF_3$.

12. A process according to claim 3, wherein oxidation of the perfluorodioxoles of formula (I) occurs at a temperature in the range of between −90° C. and −30° C.

13. A process according to claim 3, wherein the reduction of formula (III) compounds is carried out by using HI or HI/$SO_2$ under protic conditions.

14. A process according to claim 3, wherein the reduction of the formula (III) compounds is carried out by using reducing agents in hydroalcoholic medium.

* * * * *